United States Patent [19]

Heuvel et al.

[11] Patent Number: 5,629,707

[45] Date of Patent: May 13, 1997

[54] FLEXIBLE SIGNAL SOURCE LOCATION APPARATUS AND METHOD THEREFOR

[75] Inventors: Dean P. V. Heuvel, Chandler; Scott D. Blanchard; Joseph O. Lester, both of Mesa, all of Ariz.

[73] Assignee: Motorola, Inc., Schaumburg, Ill.

[21] Appl. No.: 369,617

[22] Filed: Jan. 6, 1995

[51] Int. Cl.$^6$ .............................. G01S 5/02; H04B 7/185; H04B 1/00

[52] U.S. Cl. .................... 342/357; 455/12.1; 455/54.1

[58] Field of Search ........................ 342/357, 457; 364/449; 455/54.1, 121

[56] References Cited

U.S. PATENT DOCUMENTS

| | | | |
|---|---|---|---|
| 3,209,357 | 9/1965 | Wyatt | 342/357 |
| 4,166,694 | 9/1979 | Russell et al. | 342/457 |
| 5,041,833 | 8/1991 | Weinberg | 342/357 |
| 5,293,642 | 3/1994 | Lo | 342/457 |
| 5,386,370 | 1/1995 | Woo | 364/449 |

OTHER PUBLICATIONS

"Geolocation of Frequency–Hopping Transmitters via Satellite", Technical Report distributed by Defense Technical Information Center, A. Sonnenschein, W. K. Hutchinson, Technical Report 900, 6 Nov. 1990, Lincoln Laboratory, Massachusetts Institute of Technology, Lexington, Massachusetts.

"Geolocation Via Satellite: A Methodology and Error Analysis", Technical Report distributed by Defense Technical Information Center, M. J. Shensa, Technical Report 1224, May 1988, Naval Ocean Systems Center, San Diego, California.

"Emitter Location Accuracy Using TDOA and Differential Doppler", Paul C. Chestnut, Feb. 9, 1981, IEEE Transactions On Aerospace And Electronic Systems, vol. AES–18, No. 2, Mar. 1982.

"Numerical Recipes in C", The Art of Scientific Computing, Second Edition, Cambridge University Press, pp. 683–688.

*Primary Examiner*—Gregory C. Issing
*Attorney, Agent, or Firm*—Gregory J. Gorrie

[57] ABSTRACT

A subscriber unit (26) communicates with a satellite (12) using electromagnetic signals so that observations (102) of the signals are obtained. Surface contours are generated (104) based on the signal component measured. The surface contour intersections produce candidate locations on the earth's surface. The candidate locations seed a least-squares estimation to produce final locations. Data produced during the least-squares fit is used to generate confidence ellipses (116) about the final locations. Most likely actual locations are determined from the fit associated with the confidence regions. A variety of signal source measurements can be used while providing a best estimate of a signal source location when an exact solution is not mathematically possible. The location is converted to coordinates that can be used in a satellite communication system (10) for making decisions regarding the granting or denying of communication services, billing rate and the like.

17 Claims, 3 Drawing Sheets

FLEXIBLE SIGNAL SOURCE LOCATION APPARATUS AND METHOD THEREFOR

FIELD OF THE INVENTION

The present invention relates generally to radio telecommunications systems that relay communications through satellites. More specifically, the present invention relates to satellite-based communication systems in which locations of subscriber units are determined.

BACKGROUND OF THE INVENTION

In a global radio telecommunications system, the system and those who operate the system generally have no control over where the subscriber units are located. The communication system though, is responsible for granting or denying particular communication services depending upon whether or not the system has received permission to operate at a location where a particular subscriber unit may happen to be located. Moreover, the system may be responsible for billing in connection with the use of communication services, and the rates charged for such services and parties to receive revenues from the services may vary from location to location.

A radio telecommunications system may grant and deny particular communication services and assign particular billing rates to calls if it knows the locations of the subscriber units. Accordingly, it would be desirable to configure the system so that the locations of subscriber units are determined and so that information describing locations is transmitted to controllers which are responsible for making decisions regarding the granting or denying of communication services, billing rates, and the like. Preferably, locations are determined as quickly as possible so that service interruptions are minimized.

Many prior art location determination systems are known, such as Global Positioning System (GPS), GLONASS, Loran, and the like. While subscriber units could be configured to incorporate components which take advantage of existing location determination systems, these components would substantially increase costs of the subscriber units. Moreover, relying on existing location determination systems could reduce reliability of the radio telecommunications system by introducing reliance upon an external system.

The techniques used by such prior art systems to determine location could potentially be incorporated into the radio telecommunications system, but the introduction of such techniques could seriously degrade communication services. For example, most prior art location systems require the use of two or more transmitters or receivers ("locators") that are located at distant positions and that are capable of transmitting or receiving signals to or from a location to be determined.

The requirement for two or more locators to be within view over the entire globe makes this approach impractical. While this requirement might be met by placing satellites in high or geosynchronous orbits around the earth, higher orbits place satellites further away from subscriber equipment on the earth. This larger distance causes the subscriber equipment to consume excessive power or incorporate massive antennas just to participate in communication services. Moreover, higher orbits require increased spectrum allocation to carry a given amount of communications because the allocated spectrum can be reused less frequently in a given area.

Prior art systems also perform signal source location within a number of pre-defined scenarios. GPS, for example, uses a number of signal time of arrival (TOA) along with current time to determine location. Although this system works well within the predefined scope, the measured quantities must be appropriate for that system. In addition, when all measurements are not available, no solution is possible. Furthermore, additional signal data from other measurements or observations can not be used to enhance the solution. The location of a signal source, such as a subscriber unit is further complicated by real-world environmental problems such noise and atmospheric effects which have an effect on the accuracy of signal measurements, and the resultant location.

Thus what is needed are an improved radio telecommunications system and method. What is also needed are a method and apparatus that determines the location of subscriber units relatively quickly. What is also needed are a method and apparatus that determines the location of a subscriber unit with one or more signal observation. What is also needed are a method and apparatus that uses a variety of received signal data to determine the location of a signal source. What is also needed are a method and apparatus that is flexible enough to adapt to various input to determine the location of a signal source. What is also needed are a method and apparatus that uses either simultaneous signal measurements or signal measurements spaced out in time. What is also needed are a method and apparatus that uses additional observations or measurements of various types to enhance a location solution. What is also needed are a method and apparatus that provides a confidence level for solution locations when exact solutions are not possible.

BRIEF DESCRIPTION OF THE DRAWINGS

In the drawings, like reference numbers refer to similar items throughout the figures.

DETAILED DESCRIPTION OF THE DRAWINGS

The present invention provides, among other things, an improved radio telecommunications system and method that determines a locations of a subscriber unit anywhere on or near the surface of earth. Furthermore, the present invention determines the location of a subscriber unit using no more than a single satellite which can orbit earth in a low-earth orbit. The present invention also determines subscriber unit locations quickly and reports the accuracy to which a subscriber unit's location is determined, so that effort is not wasted resolving a location to a greater degree of accuracy than is needed.

The present invention uses a variety of received signal data to determine the location of a signal source. The present invention is also flexible enough to adapt to various input to determine the location of a signal source. The present invention also uses either simultaneous signal measurements or signal measurements spaced out in time to determine a subscriber unit's location. It also uses additional observations or measurements of various types to enhance a location solution. In a preferred embodiment, the present invention also provides confidence regions associated with solution locations.

A "satellite" is defined herein to mean a man-made object or vehicle intended to orbit earth and includes both geostationary and orbiting satellites and/or combinations thereof including low-earth orbiting (LEO) satellites. The present invention is applicable to systems including satellites having low-earth orbits. Additionally, it is applicable to orbits having any angle of inclination (e.g., polar, equatorial or other orbital pattern).

Figure 1:
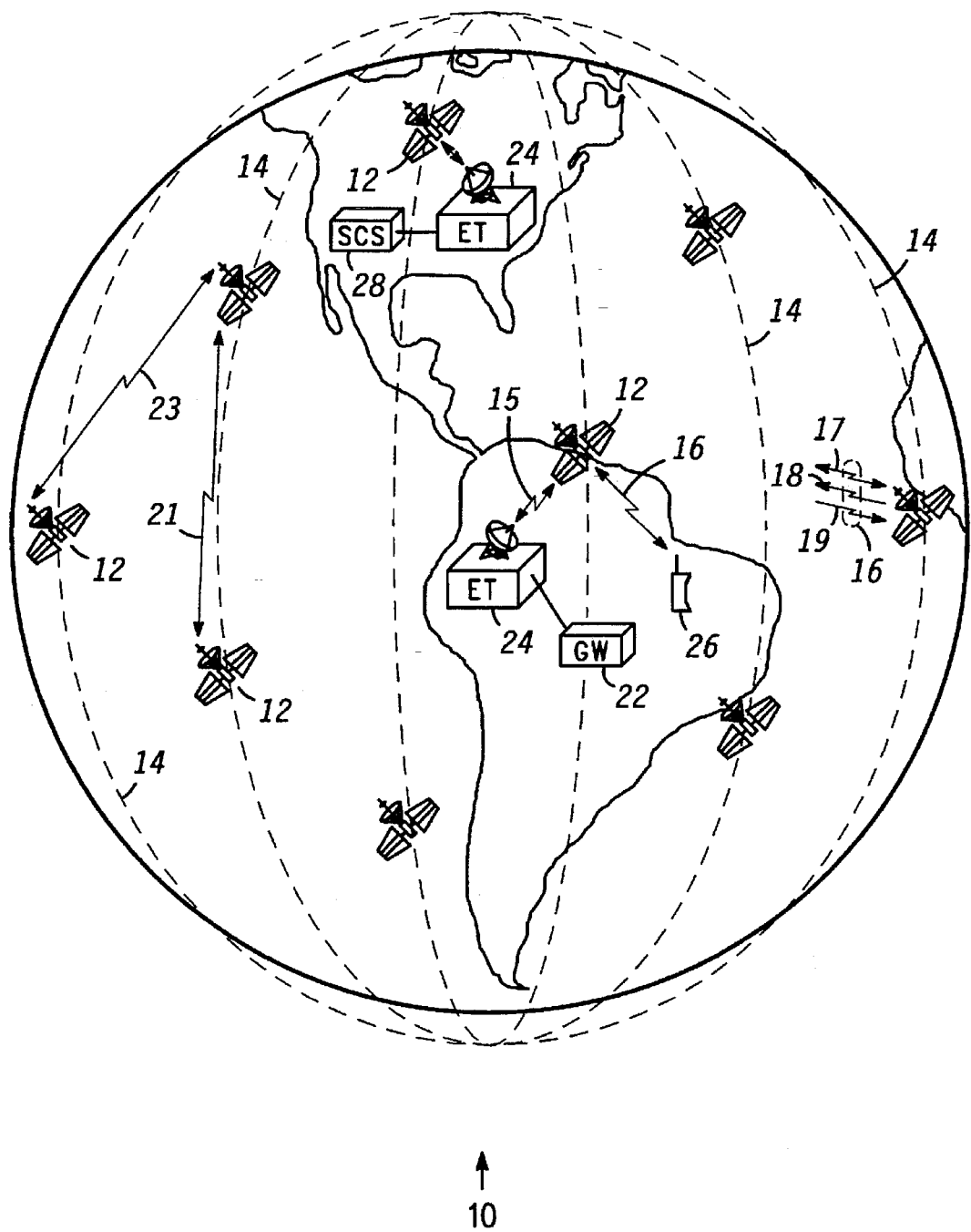
FIG. 1 illustrates a highly simplified diagram of a satellite-based communication system with which the present invention can be practiced.

FIG. 1 illustrates a highly simplified diagram of satellite-based communication system 10 with which the present invention can be practiced. Communication system 10 uses six polar orbits 14, with each orbit 14 holding eleven satellite communication stations 12 for a total of sixty-six satellites 12. However, this is not essential and more or fewer satellites, or more or fewer orbits, can be used. While the present invention is advantageously employed when a large number of satellites are being used, it is also applicable with as few as a single satellite. For clarity, FIG. 1 illustrates only a few satellite communication stations 12.

For example, each orbit 14 encircles earth at an altitude of around 780 km, although higher or lower orbital altitudes can be usefully employed. Due to the relatively low orbits of exemplary satellites 12, substantially line-of-sight electromagnetic (e.g., radio, light) transmission from any one satellite or reception of signals by any one satellite involves or covers a relatively small area of earth at any instant.

For the example shown, satellites 12 travel with respect to earth at around 25,000 km/hr, allowing satellite 12 to be visible to a terrestrial station for a maximum period of approximately nine minutes. Satellite communication stations 12 communicate with terrestrial stations which may include some number of radio communication subscriber units 26 and earth terminals (ETs) 24 connected to system control segment (SCS) 28. ETs 24 can also be connected to gateways (GWs) 22, which provide access to the public switched telephone network (PSTN) or other communications facilities. Only one each of GWs 22, SCS 28 and SUs 26 are shown in FIG. 1 for clarity and ease of understanding. ETs 24 can be co-located with or separate from SCS 28 or GW 22. ETs 24 associated with SCSs 28 receive data describing tracking of satellites 12 and relay packets of control information while ETs 24 associated with GWs 22 only relay data packets (e.g., relating to calls in progress).

SUs 26 may be located anywhere on the surface of the earth or in the atmosphere above the earth. SUs 26 are preferably communications devices capable of transmitting data to and receiving data from satellites 12. By way of example, SUs 26 are hand-held, portable cellular telephones adapted to communicate with satellites 12. Ordinarily, SUs 26 need not perform any control functions for communication system 10.

Communication system 10 may accommodate any number, potentially in the millions, of subscriber units 26. In the preferred embodiments of the present invention, subscriber units 26 communicate with nearby satellites 12 via subscriber links 16. Links 16 encompass a limited portion of the electromagnetic spectrum that is divided into numerous channels. Links 16 are preferably combinations of L-Band frequency channels and may encompass Frequency Division Multiplex Access (FDMA) and/or Time Division Multiple Access (TDMA) communications or combination thereof. A channel is defined as at least one reoccurring time-slot of a frequency channel. As a minimum, a satellite 12 continuously transmits over one or more broadcast channels 18. Subscriber units 26 synchronize to broadcast channels 18 and monitor broadcast channels 18 to detect data messages which may be addressed to them. These data messages include both ring-alerts which notify a subscriber unit that another party desires communication, as well as pages which deliver specific messages. Subscriber units 26 may transmit messages to satellites 12 over one or more acquisition channels 19. Broadcast channels 18 and acquisition channels 19 are not dedicated to any one subscriber unit 26 but are shared by all subscriber units 26 currently within view of a satellite 12. The acquisition process is described in more detail below.

On the other hand, traffic channels 17 are two-way channels that are assigned to particular subscriber units 26 by satellites 12 from time to time. In the preferred embodiments of the present invention, a digital format is used to communicate data over channels 17–19, and traffic channels 17 support real-time communications.

Satellites 12 communicate with other nearby satellites 12 through cross links 23. Thus, a communication from a subscriber unit 26 located at any point on or near the surface of the earth may be routed through the constellation of satellites 12 to within range of substantially any other point on the surface of the earth. A communication may be routed down to a subscriber unit 26 on or near the surface of the earth from a satellite 12 using a subscriber link 16. Alternatively, a communication may be routed down to or up from any of many ETs 24, of which FIG. 1 shows only two, through earth links 15. ETs 24 are preferably distributed over the surface of the earth in accordance with geo-political boundaries. In the preferred embodiments, each satellite 12 may communicate with up to four ETs 24 and over a thousand subscriber units 26 at any given instant.

SCS 28 monitors the health and status of system communication nodes (e.g., GWs 22, ETs 24 and satellites 12) and desirably manages operations of communication system 10. One or more ETs 24 provide the primary communications interface between SCS 28 and satellites 12. ETs 24 include antennas and RF transceivers and preferably perform telemetry, tracking and control functions for the constellation of satellites 12.

GWs 22 may perform call processing functions in conjunction with satellites 12 or GWs 22 may exclusively handle call processing and allocation of call handling capacity within communication system 10. Diverse terrestrial-based communications systems, such as the PSTN, may access communication system 10 through GWs 22.

With the example constellation of sixty-six satellites 12, at least one of satellites 12 is within view of each point on earth's surface at all times (i.e., full coverage of the earth's surface is obtained). Theoretically, any satellite 12 may be in direct or indirect data communication with any SU 26 or ET 24 at any time by routing data through the constellation of satellites 12. Accordingly, communication system 10 may establish a communication path for relaying data through the constellation of satellites 12 between any two SUs 26, between SCS 28 and GW 22, between any two GWs 22 or between SU 26 and GW 22.

Figure 2:
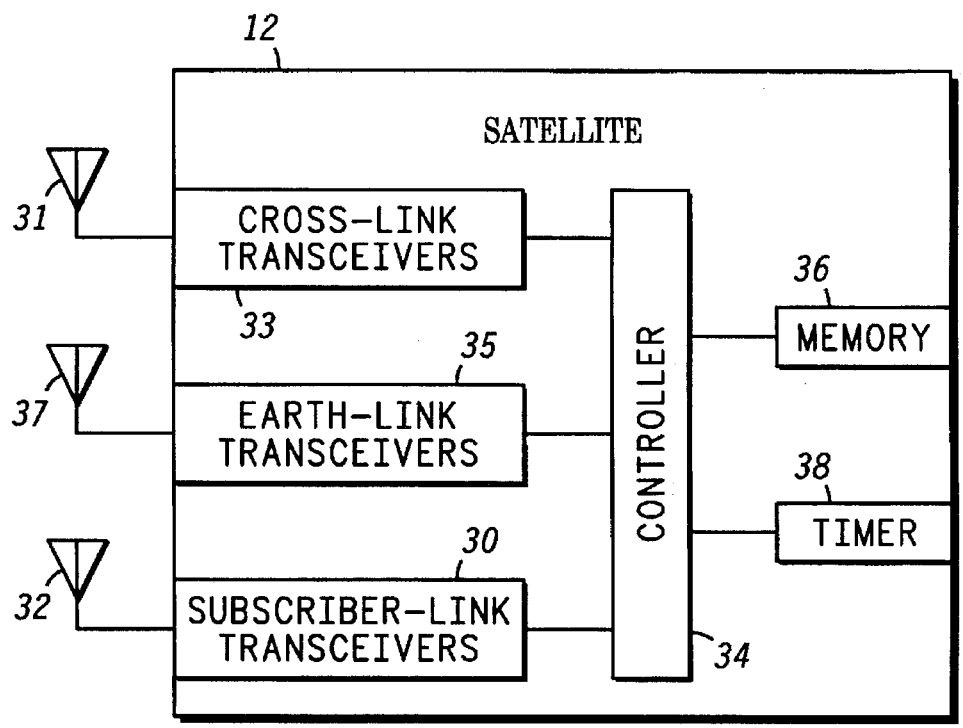
FIG. 2 illustrates a simplified block diagram of a satellite communication station suitable for use in a preferred embodiment of the present invention.

FIG. 2 illustrates a simplified block diagram of satellite communication station 12 suitable for use in a preferred embodiment of the present invention. Preferably, all satellites 12 within system 10 (see FIG. 1) include equipment as illustrated by the block diagram of FIG. 2. Satellite 12 includes cross-link transceivers 33 and associated antennas 31. Transceivers 33 and antennas 31 support cross-links to other nearby satellites 12. Earth-link transceivers 35 and associated antennas 37 support earth-links to communicate with earth terminals 24 (FIG. 1). Subscriber-link transceivers 30 and associated antennas 32 support subscriber units 26 (FIG. 1). Preferably, each satellite 12 may simultaneously support a link for up to several thousand or more of subscriber units 26 (FIG. 1). Of course, those skilled in the art will appreciate that antennas 31, 37, and 32 may be implemented either as single multi-directional antennas or as banks of discrete antennas. It is desirable that each subscriber-link antenna 32 be a phased array antenna capable of accessing many antenna beams simultaneously.

A controller 34 couples each of transceivers 33, 35, and 30 as well as to a memory 36 and a timer 38. Controller 34 may be implemented using one or more processors. Controller 34 uses timer 38 to maintain, among other things, the current date and time. Memory 36 stores data that serve as instructions to controller 34 and that, when executed by controller 34, cause satellite 12 to carry out procedures which are discussed below. In addition, memory 36 includes variables, tables, and databases that are manipulated during the operation of satellite 12.

Subscriber-link transceivers 30 are desirably multi-channel FDMA/TDMA transceivers capable of transmitting and receiving on all different selectable frequencies during particular, selectable, time-slots as directed by controller 34. Subscriber-link transceivers 30 contain multi-channel radios having a sufficient number of channels to provide the desired number of transmission and reception frequencies for signal access and control and for the user voice and/or data. Controller 34 may provide for allocation of the frequency and time-slot assignments, antenna beam-to-antenna beam hand-off and other overhead and management and control functions. Controller 34 includes processors for collecting measurement quantities from received signals from subscriber units. In one embodiment, controller 34 includes processors including location processors for determining locations of subscriber units based on the measurement quantities and information stored in memory 36. These functions are discussed in more detail below. Subscriber-link transceivers 30 desirably provide for transmission and reception on any frequency channel set so that each subscriber-link transceivers 30 may, if needed, utilize the entire spectral capacity of all frequency channel sets by having the capability to handle all frequency and time-slot assignments.

Figure 3:
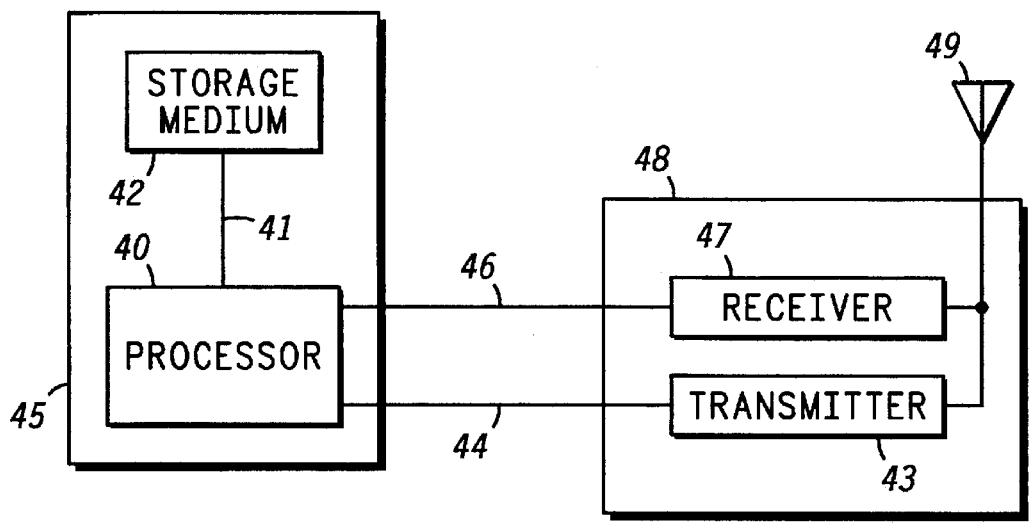
FIG. 3 illustrates a simplified block diagram of a system control station and a terrestrial station suitable for use in a preferred embodiment of the present invention.

FIG. 3 illustrates a simplified block diagram of system control station 45 and terrestrial station 48 suitable for use in a preferred embodiment of the present invention. Control station 45 and terrestrial station 48 are desirable part of SCS 28 (FIG. 1) and ET 24 (FIG. 1) respectively. Control station 45 comprises processor 40 coupled to associated storage medium 42 (e.g., random access memory or RAM, other semiconductor or magnetic read-write memory devices, optical disk, magnetic tape, floppy disk, hard disk) via link 41. Terrestrial station 48 includes antenna 49 coupled to transmitter 43 and receiver 47. Transmitter 43 and receiver 47 are coupled to processor 40 via links 44 and 46, respectively. Processor 40 desirably carries out procedures exemplified below and described in the associated text. For example, in addition to performing other tasks as appropriate, processor 40 desirably stores results from such procedures in storage medium 42. Transmitter 43 and/or receiver 47 transmit messages to and/or receive messages from satellites 12.

Processor 40 generally controls and manages user access, message reception and transmission, channel setup, radio tuning, frequency and time-slot assignment, and other cellular radio communication and control functions not managed or provided for by controller 34 (FIG. 2). Among other things, processor 40 and/or controller 34 (FIG. 2) desirably executes procedures to allow user access to communication system 10. This may include protocol procedures for channel setup and other associated functions as discussed below.

In reference to FIG. 1, system 10 accommodates the movement of SUs 26 anywhere on or near the surface of the earth. However, nothing requires SUs 26 to move, and system 10 operates satisfactorily if a portion of the entire population of SUs 26 remains stationary. The present invention is applicable to SUs 26 that are either stationary, moving or movable.

In the preferred embodiment, electromagnetic signals traveling at or near the speed of light between an SU 26 positioned near the surface of the earth and a satellite communication station 12 in such an orbit will require a propagation duration of approximately 2–3 msec or more, depending on the satellite's angle of view. Moreover, electromagnetic signals traveling between an SU 26 positioned near the surface of the earth and a satellite 12 in such an orbit may experience a considerable Doppler component of frequency shift, the precise value of which is dependent on, among other things, a source frequency, the satellite's distance to the subscriber unit and the relative velocity between the satellite and the subscriber unit.

Figure 4:
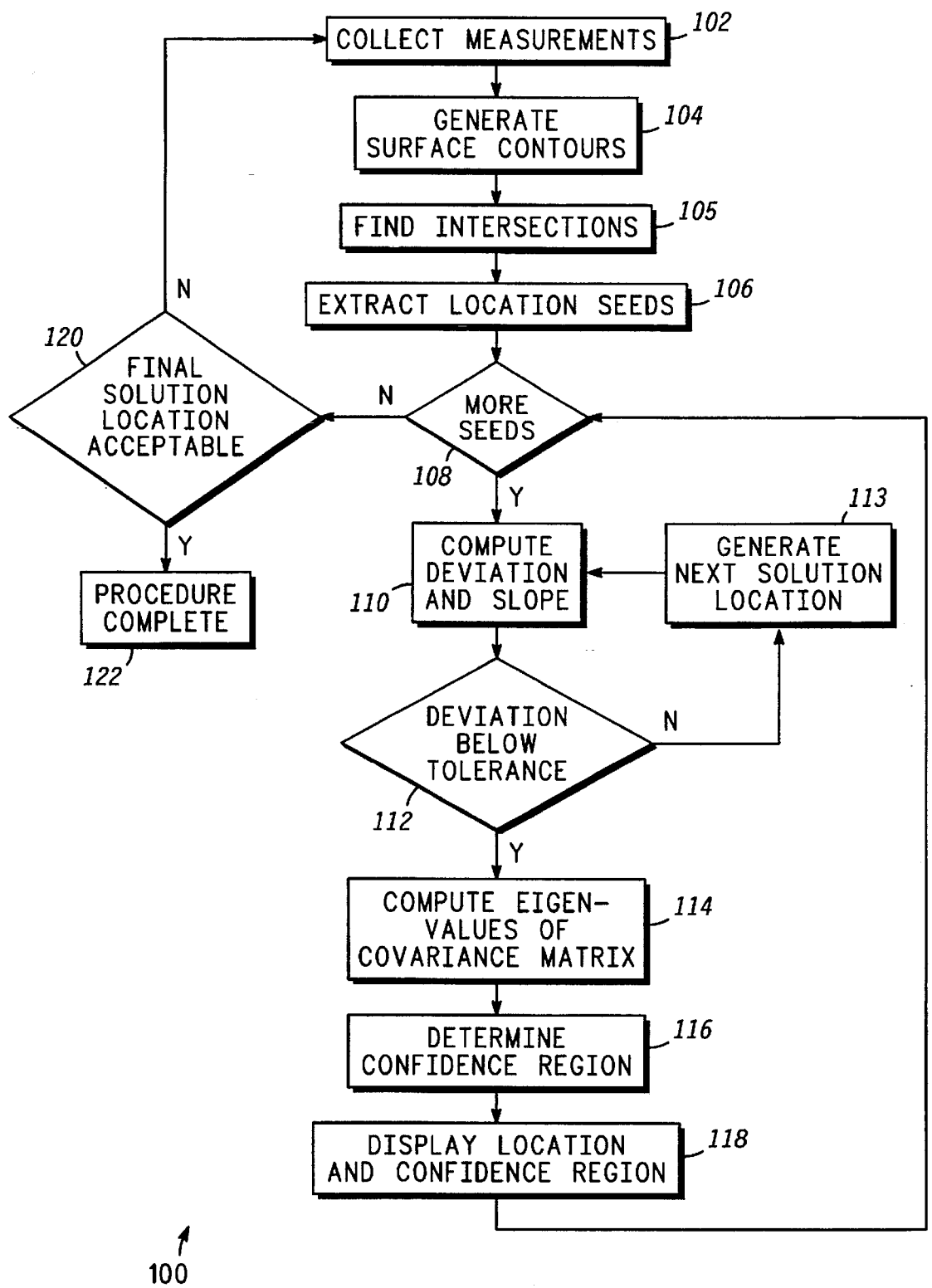
FIG. 4 shows a flow chart of a signal source location determination procedure suitable for use in a preferred embodiment of the present invention.

FIG. 4 shows a flow chart of signal source location determination procedure 100 suitable for use in a preferred embodiment of the present invention. Portions of procedure 100 may be performed by any node of communication system 10 (FIG. 1) including satellite nodes 12, SCS 28, GW 22 or SUs 26. Procedure 100 is used to determine the location of a transmitting signal source such as a subscriber unit. In the preferred embodiment, procedure 100 determines the location of a subscriber unit that is located on or near the surface of the earth.

Location procedure 100 generally involves generating surface contours based on initial signal measurements, generating surface locations, and generating statistical confidence regions surrounding the surface locations. In the preferred embodiment, the intersections of the surface contours produce candidate locations that are used to "seed" a least-squares estimation to produce final surface locations including final near-surface locations. In the preferred embodiment, confidence ellipses are generated around the final locations using data produced during the least-squares process. When solution locations are not bound by the earth's surface, other methods of seed generation are employed.

Step 102 collects measurements from a signal source. Each measurement has an associated basis function including frequency of arrival (FOA), time of arrival (TOA), time-difference of arrival (TDOA), rate of change of TOA (TOA dot), angle of arrival (AOA), frequency difference of arrival (FDOA) and rate of change of TDOA (TDOA dot). For the purpose of procedure 100, the number of necessary measurements depends on, among other things, what measurable quantities are available and the level of accuracy desired in determining the location of the source. Because all measurements have some error, the error in these measurements can be viewed as random variables that have a Gaussian distribution. Each measurement therefore exhibits a characteristic variance. The variance of each measurement is related to the measurement accuracy of the receiver which is making the measurement along with conditions affecting the measurement such as atmospheric conditions. In the preferred embodiment, the variances associated with each measurement type are known.

In general, at least two observations of a signal source are necessary to locate a signal source. When the measured quantities are different, the two observations are preferably simultaneous. However, when the measured quantities are the same, the observations are desirably separated in time. For example, FOA may be measured simultaneously with TOA. Alternatively, two TOA observations are measured at different times.

Preferably, step 102 collects measurements at a single observation position, however step 102 may also collect measurements from multiple observation positions. For example, step 102 may collect measurements from two or more satellites simultaneously, or at different times. In addition, step 102 may collect measurements from one satellite, but at different orbital positions of the same satellite.

The measurement quantities may also be collected by several satellites or by aircraft. While step 102 is preferably performed by one or more satellites 12, steps 104–122 are preferably performed by GW 22 (FIG. 1); however, nothing requires this. Satellites 12 can also perform all or some of steps 104–122. As discussed above, virtually any combination of measurements which are affected by a signal source's location can be used in procedure 100. In addition, if the measurement requires other estimates of the signal source's characteristics, this is accomplished by increasing the dimensions of a position vector associated with the signal source. For example, geolocation based solely on FOA requires a four-dimensional position vector including the signal source's location and frequency of transmission. Those of skill in the art will understand that the difference between a FOA and frequency of transmission is generally due to Doppler shift and atmospheric effects. For any given instant in time, GW 22 (FIG. 1) maintains precise position and velocity information for satellites 12 which is used in procedure 100.

Step 104 pairs the measured values with an appropriate location function and generates surface contours associated with each function. The surface contours are defined such that a signal generated at any point on the surface would result in an identical measurement. Step 104 also generates the associated contour lines for each measurement. Surface contour lines result when the surface contour intersects with the earth's surface. These contour lines include candidate locations for the signal source.

For example, the rate of change of TOA data results in a cone (conical surface) about the velocity vector of the observer (e.g., satellite) with the apex of the cone at the observer's position. The generation of the surface contour line is the intersection of the cone with the earth's surface. In the case of TDOA data, the resulting surface is a hyperboloid of two sheets with one observer at each locus. Those of skill in the art will be able to pair the appropriate surface contour with each measurement when provided with the particular geometry of system 10 (FIG. 1). Those of skill in the art will understand that some measurement data results in multi-dimensional "surface" contours.

Preferably, for ease of calculations, the surface contour lines are represented by a plurality of line segments. In a preferred embodiment, these segments are generated by creating and connecting a finite set of points which lie on both surfaces. Since the surface contours are used for generation of initial seed locations which represent initial position estimates, the surface contours approximate the true solution set. In that regard, the use of line segments representing surface contours drastically reduces the computations necessary.

In generating the surface contours, step 104 compensates for any changes of geometry that may have occurred between measurements. For example, when measurements are taken separated in time, the position of the observation point may have changed because satellites 12 are moving rapidly with respect to the location of a subscriber unit. In addition, the rotation of the earth affects the position of a subscriber unit. Step 104 compensates for these changes in geometry, by preferably correcting at least one set of data. In this way, measured data from multiple observations can be treated as though the measurements were made simultaneously.

Step 105 finds the intersection points of the surface contour lines. Finding the exact intersection points is difficult to determine in a time-efficient manner because of the amount of computations required. Therefore, procedure 100 preferably utilizes a more time-efficient approach. For example, the general area of an intersection is isolated to within two or three line segments of the contours. For each point on the contour, an angle to an alternate observer velocity vector is tested to determine if any point is either inside or outside of an alternative cone resulting from the velocity vector. A change of state indicates that a crossing has occurred and the segment is identified as a likely candidate to contain an intersection.

While this approach is much less time consuming, errors arise due to the alternative observer velocity vector. Because the surface contours are made up of a finite number of segments, the contours are an approximation of the true intersection. Therefore even though a segment is identified, the actual crossing may be detected in an adjoining segment instead, particularly if the true crossing is near a contour point. For this reason, the indicated crossing segments are tested along with adjoining segments to find intersecting segments.

Once the intersecting segments have been located, their intersection point is computed. Since each line segment is represented by two vectors, one for each segment endpoint, that originate at the center of the earth, the two vectors define a plane in space which contains the entire line segment. The two alternative vectors (i.e., from the alternative observation) define a second plane. The intersection of the two line segments must lie on the intersection of the two planes. In this way, the intersection line of the two planes always exists even if the two line segments do not actually intersect. A valid intersection point can then be located. Because this process is independent of the magnitude of the input endpoint vectors and the magnitude of generated vectors, computation time is significantly reduced.

Step 106 extracts the seed locations from the valid intersection points found in step 105. The seed locations are preferably stored as a set of initial location estimates which are an initial estimate of the signal source's location. In the preferred embodiment, an intelligent location seeding process is used. Preferably, the initial seed locations are the intersections of the surface lines described above. However, other seed generation techniques can also be used, for example, when no intersections are found or only one or a few intersections are found. When additional seeds are desired, a proximity seeding method is preferably used to generate the additional seeds. For example, closest points between contours are identified and used as seeds.

The initial starting locations (e.g., seed locations) are important to the accuracy of the location process. For example, if an error "surface" were restricted to three dimensions, the earth's surface can be viewed for illustrative purposes as covered with a shell which has a surface having pits, valleys and ridges. The error surface refers to the location error associated with each corresponding point on the earth's surface. The best estimate of a signal source's location is the point on the error surface having the lowest value or the deepest pit in the error surface. If an initial seed location is far from the source location, some other valley or pit (a local surface minimum) may be found before the correct location is determined.

In most situations, equations in many more than three dimensions are used represent the error "surface" because the error surface is multi-dimensional. The gradient of the equations may be viewed as the "slope" of this multi-dimensional error surface.

Depending on the geometries of the observation and source and the measured parameter functions from step 102, a relatively smooth error surface may result which is easy to traverse and locate the absolute minimum. Some cases that include extremely non-orthogonal or non-intersecting surface contours and especially those that include a large number of functional components lead to rougher error surfaces having more pits and valleys which are more difficult to search for the absolute minimum over wider ranges. In the case of a smoother error surface, the seed location is less critical because almost any starting location will lead to an ideal solution. When the surface is rough and contains many valleys or pits, starting the search as close to the likely solutions is critical. Thus it is preferable for the seed generating process of step 106 to generate likely solutions.

Step 108 determines if all the seeds generated in step 106 have been used in steps 110–118. If there are more seeds available, step 110 is performed. If there are no more seeds, step 120 is executed.

Once the set of initial seed locations are available, final locations can be estimated. Step 110 takes each seed location and computes a deviation from the measured values using current system geometry and the estimated seed location. Ideally, using a least-squares process, the deviation would approach zero and an ideal solution would be found. However, it is less likely that an ideal solution will be found initially. To proceed from the current estimated location to another location, preferably with a smaller deviation, information about the local error surface is necessary. In addition to deviation information, the gradient (i.e., slope) of the error surface around the location is computed for each measurement function so that a better solution can be generated down the steepest slope from the current location. Step 112 determines if the deviation improvement for this iteration of step 112 is below a predefined value, and if not, step 113 generates a next solution location. Step 110 then computes a combined gradient of each of the measurement functions at that solution location.

A least-squares minimization process has some ability to avoid local minima. If a next best solution were limited to those below the current location, a local minima would not be escapable. For this reason, the process searches within the general area of the current location on the error surface to locate a steeper slope, and desirably a better solution. Because this capability of a least-squares minimization process is somewhat limited, it is desirable to generate reliable seed locations. One least-squares process suitable for use in the present invention can be found in "Numerical Recipes in C" by William H. Press, Saul A. Teukolsky, William T. Vetterling, and Brian P. Flannery. This process in know as the "Levenburg-Marquardt" method.

The least-squares process weights each measured parameter in accordance with a variance associated with that measured parameter. The variances of the measured parameters are combined to produce a covariance matrix. The covariance matrix describes how each parameter is affected by the variances in the other parameters.

Steps 110, 112 and 113 are repeated until the reduction in the deviation from one solution to another is below a predefined tolerance. The deviation is used below in steps 116 and 118 to estimate how well the measured data fits the solution.

In the case of more than two surface contours, an ideal location from a geometric standpoint is not always possible. The surface contours may not intersect at a single point. If there is an intersection, the intersection will define a single point but because the surface intersections are made up of a series of segments, the intersection is not an ideal representation of the solution location. To further refine the solutions, a statistical error-minimization procedure is employed. For example, in the case of three surface contour lines that intersect at approximately one location, there may really be three separate two-line intersections. Any of these might be the ideal solution, or the ideal solution might lie somewhere in-between.

Step 114 computes the eigen-values of the covariance matrix. In other words, the covariance matrix is diagonalized. The eigen-values represent the orientation of an ellipse's major and minor axes relative to standard coordinate system axes, which in this case is a local vertical coordinate system.

Step 116 generates a confidence region for the particular seed location being considered using the eigen-values from step 114. Step 116 is performed for each seed location as procedure 100 executes the loop of steps 110–118. Because of the statistical variance associated with any measured parameter, there is an uncertainty associated with any corresponding location values generated. For example, a surface contour line may be displaced by some amount due to uncertainty in the measurement. In addition to the displacement, the surface contour lines are really a somewhat wider path (an uncertainty region) because the measurement inaccuracy. Thus the intersection of two surface contour lines including their uncertainty region, can result in a considerable surface area.

Step 116 produces a statistical confidence region around each solution location. All locations within this region are equally valid final solution locations. Because it is impossible to know a final solution location with any more accuracy than the measured parameters, a confidence region reflects a degree of uncertainty with that region. For example, a ninety percent confidence region may be generated for certain applications, while a fifty percent confidence region may be generated for other applications. The fifty percent confidence region will naturally be smaller than the ninety percent confidence region. The greater the area, the higher the confidence level.

In the preferred embodiment, the confidence region for a refined location estimate is an ellipse (an elliptical area) because the measurements of step 102 are based on data that generally has a Gaussian distribution. Three-dimensional confidence intervals produce an ellipsoid which is projected onto the surface of the earth resulting in the confidence ellipse. The confidence ellipse quantifies the inaccuracy due to errors in the measurement quantities of each of the locations produced in step 113. As discussed above, the locations produced are not exact for reasons such as measurement error, computational approximations and round-off and the geometrical configuration. Multiple locations are likely due to reflexive geometry with limited measurement sets.

In the preferred embodiment, in generating the elliptical surface area, the three-dimensional ellipsoid is projected onto a local tangent plane that is tangent to the earth's surface at a point defined by the solution location. This results in a planar ellipse. Then the ellipse is projected onto a spherical or oblate surface representing earth's surface. Data transformation may be necessary. These are accomplished by linear algebra techniques well known to those skilled in the art.

In a preferred embodiment, step 118 displays the location from step 113 and the confidence ellipse region from step 116. In one embodiment, the confidence ellipse region or outline is displayed on a video screen in a color that depicts the deviation information generated in step 110. In another embodiment, the display information is stored in memory.

After step 118, procedure 100 loops back to step 108 to determine if steps 110–118 have been performed for all seed locations. If all seeds have been used, step 120 is executed. Step 120 determines if a final solution location is acceptable. For example, many solution locations may be generated in steps 110–113, some of which may have small confidence regions and some having larger confidence regions. Some solution locations have low deviations while other have larger deviations.

In one embodiment, the confidence regions and associated final solutions are sent to GW 22 (FIG. 1) where they is used for subscriber unit billing and other functions discussed above. Procedure 100 is performed again whenever the location of any subscriber unit is desired.

In summary, the present invention provides an improved radio telecommunications system and method that determine locations of subscriber units. A subscriber unit's location is determined using a satellite which orbits the earth in a low-earth orbit. No more than one satellite needs to be used to determine a subscriber unit's location, although more than one satellite can be used. Moreover, the low-earth orbit is advantageous for communications because lower power subscriber units can be used and spectrum is reused more efficiently.

An iterative process is used to refine initial seed locations into a solution which converges on final locations with associated confidence regions. Subscriber unit locations are determined quickly for the vast majority of locations. Relatively inaccurate location determination accuracy may be sufficient for the vast majority of locations. The present invention identifies when greater accuracy is required, and additional observations are performed when required to achieve the greater accuracy. In short, the present invention refrains from wasting time and system capacity in resolving location to a greater degree of accuracy than is needed by the system. Once a location has been determined, the system and method of the present invention use this location to qualify communication services offered by the system.

Those skilled in the art will recognize that changes and modifications may be made in these preferred embodiments without departing from the scope of the present invention. For example, those skilled in the art will appreciate that the flow chart presented herein is intended to teach the present invention and that different techniques for implementing program flow that do not necessarily lend themselves to flowcharting may be devised. In particular, each step discussed herein may be interrupted to permit program flow to perform background or other steps. In addition, the specific order of steps may be changed, and the specific techniques used to implement the steps may differ from system to system.

What is claimed is:

1. In a satellite communication system that includes an earth terminal and satellites, a method of providing an estimate of a location of a subscriber unit that is emitting a signal comprising the steps of:

collecting, by at least one of said satellites, two measurements of said signal, each of said measurements having a measurement error associated therewith;

sending said measurements to said earth terminal;

generating a surface contour for each of said measurements; finding intersection points and near intersection points between said surface contours and a surface contour representing earth's surface;

using said intersection points and near intersection points to seed a least-squares algorithm to generate final locations;

generating statistical confidence regions around each final location using said measurement error, each confidence region having a probability associated therewith indicating the probability that said subscriber unit is within the associated confidence region, each confidence region corresponding with a geographic region on earth's surface; and when smaller confidence regions are desired, collecting additional measurements of said signal and repeating the steps of sending, finding, using and generating to increase said probability associated with each confidence region.

2. A method as claimed in claim 1 wherein the finding step further comprises the steps of:

finding surface contour lines that represent intersections between each surface contour and said surface contour representing earth's surface;

representing each of said surface contour lines with line segments;

isolating intersection regions between said surface contour lines to within three of said line segments;

for each line segment, defining a plane as end-points of said line segment and earth's center point; and using intersection points between pairs of said planes and said surface contour representing earth's surface to seed said least squares algorithm.

3. A method as claimed in claim 2 wherein said communication system includes a gateway, and wherein said method further comprises the steps of:

sending said confidence regions and their associated geographic region to said gateway;

said gateway evaluating said confidence regions and their associated geographic region to determine whether said subscriber unit is permitted to operate within said geographic region; and granting communication services to said subscriber unit when said subscriber unit is permitted to operate within said geographic region; and denying communication services to said subscriber unit when said subscriber unit is not permitted to operate within said geographic region.

4. A method as claimed in claim 2 wherein said line segments are comprised of points, and wherein the finding step further comprises the step of testing, for each of said points on said three line segments of said intersection regions, whether an alternate observer velocity vector is inside or outside a conical surface generated from said velocity vector.

5. A method as claimed in claim 1 further comprising the steps of:

calculating a gradient for each of said surface contours; and calculating a deviation for each of said intersection points, and wherein the using step includes the step of generating said final locations using a least-squares minimization process that minimizes said deviation, each of said final locations having a deviation below a predetermined value.

6. A method as claimed in claim 1 further comprising the steps of:

generating a covariance matrix from individual measurement variances associated with said measurements collected in the collecting step;

computing eigen-values of said covariance matrix; and determining said statistical confidence region around each of said final locations using said individual measurement variances and said eigen-values.

7. A method as claimed in claim 6 wherein said measurements have a substantially Gaussian error distribution, and wherein the generating step comprises the step of determining a confidence ellipse around each of said final locations.

8. A method as claimed in claim 6 further comprising the step of displaying said statistical confidence region and said at least one of said final solution locations on a video display, said statistical confidence region being displayed in a color that is determined based on said deviation.

9. A method as claimed in claim 6 wherein the sending step further comprises the step of sending location information representing said geographic region to a communication service provider.

10. A method as claimed in claim 1 wherein the collecting step comprises the step of collecting any two measurement types wherein said measurement types include a frequency of arrival (FOA), time of arrival (TOA), time-difference of arrival (TDOA), rate of change of TOA (TOA dot), angle of arrival (AOA), frequency difference of arrival (FDOA) or rate of change of TDOA (TDOA dot) of said signal; and wherein the generating step further comprises the step of generating said surface contours, wherein said surface contours are a function of said measurement types.

11. A method of providing an initial estimate of a location of a subscriber unit that is emitting a signal comprising the steps of:

receiving at least two measurements of said signal, each of said measurements having a measurement error associated therewith;

generating a surface contour for each measurement;

finding intersection points and near intersection points between said surface contours and a surface contour representing earth's surface;

using said intersection points and near intersection points to seed a least-squares algorithm to generate final locations;

generating statistical confidence regions around each final location using said measurement error, each confidence region having a probability associated therewith indicating the probability that said subscriber unit is within the associated confidence region, each confidence region corresponding with a geographic region on earth's surface; and when smaller confidence regions are desired, collecting additional measurements of said signal and repeating the steps of sending, finding, using and generating to increase said probability associated with each confidence region.

12. A method as claimed in claim 11 further comprising the step of collecting said measurements by a receiver located on a satellite that is moving rapidly relative to said location of said subscriber unit, said satellite having accurate positional information relative to a surface of earth, and wherein the receiving step includes the step of receiving an estimate of a location of said satellite for said measurements.

13. A method as claimed in claim 12 wherein said subscriber unit is adapted for operating with a satellite communication system, and wherein said communication system includes a gateway, and wherein said method further comprises the steps of:

sending said confidence regions and their associated geographic region to said gateway;

said gateway evaluating said confidence regions and their associated geographic region to determine whether said subscriber unit is permitted to operate within said geographic region; and granting communication services to said subscriber unit when said subscriber unit is permitted to operate within said geographic region; and denying communication services to said subscriber unit when said subscriber unit is not permitted to operate within said geographic region.

14. An apparatus for determining a location of a signal source comprising:

an earth terminal receiver for receiving measurements collected by a satellite, said measurements being from said signal source on or near earth's surface, said satellite being part of a satellite based communication system; and a processor for:

generating a surface contour for each of said measurements;

finding intersection points and near intersection points between said surface contours and a surface contour representing earth's surface;

using said intersection points and near intersection points to seed a least-squares algorithm to generate final locations;

generating statistical confidence regions around each final location using a measurement error associated with each of said measurement, each confidence region having a probability associated therewith indicating the probability that said signal source is within the associated confidence region, each confidence region corresponding with a geographic region on earth's surface; and when smaller confidence regions are desired, collecting additional measurements of said signal source and repeating the steps of sending, finding, using and generating to increase said probability associated with each confidence region.

15. An apparatus as claimed in claim 14 further comprising a gateway coupled to said earth terminal receiver for sending said confidence regions and their associated geographic region to said gateway;

said gateway evaluating said confidence regions and their associated geographic region to determine whether said subscriber unit is permitted to operate within said geographic region; and said gateway granting communication services to said subscriber unit when said subscriber unit is permitted to operate within said geographic region; and said gateway denying communication services to said subscriber unit when said subscriber unit is not permitted to operate within said geographic region.

16. An apparatus as claimed in claim 14 wherein said processor includes:

means for finding surface contour lines that represent intersections between each surface contour and said surface contour representing earth's surface;

means for representing each of said surface contour lines with line segments;

means for isolating intersection regions between said surface contour lines to within three of said line segments;

for each line segment, defining a plane as end-points of said line segment and earth's center point; and means for using intersection points between pairs of said planes and said surface contour representing earth's surface to seed said least-squares algorithm.

17. An apparatus as claimed in claim 14 wherein said processor includes:

means for calculating a gradient for each of said surface contours;

means for calculating a deviation for each of said intersection points; and means for generating said final locations using a least-squares minimization process that minimizes said deviation, each of said final locations having a deviation below a predetermined value.

* * * * *